(12) United States Patent
Hofmann et al.

(10) Patent No.: US 10,737,232 B2
(45) Date of Patent: Aug. 11, 2020

(54) HEAT EXCHANGER AND REACTOR

(71) Applicant: FRAUNHOFER-GESELLSCHAFT ZUR FORDERUNG DER ANGEWANDTEN FORSCHUNG E.V., Munich (DE)

(72) Inventors: Christian Hofmann, Mainz (DE); Helmut Pennemann, Mainz (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 0 days.

(21) Appl. No.: 16/484,871

(22) PCT Filed: Feb. 23, 2018

(86) PCT No.: PCT/EP2018/054542
§ 371 (c)(1),
(2) Date: Aug. 9, 2019

(87) PCT Pub. No.: WO2018/154063
PCT Pub. Date: Aug. 30, 2018

(65) Prior Publication Data
US 2019/0366290 A1    Dec. 5, 2019

(30) Foreign Application Priority Data
Feb. 24, 2017   (DE) .................. 10 2017 203 058

(51) Int. Cl.
*B01J 8/02* (2006.01)
*B01J 8/06* (2006.01)
(Continued)

(52) U.S. Cl.
CPC ......... *B01J 19/0013* (2013.01); *B01J 8/0285* (2013.01); *B01J 8/06* (2013.01);
(Continued)

(58) Field of Classification Search
None
See application file for complete search history.

(56) References Cited

U.S. PATENT DOCUMENTS

| 324,120 A | * | 8/1885 | Kirkaldy | ................ F28D 7/024 165/163 |
| 1,913,573 A | * | 6/1933 | Turner | .................. F28D 1/0472 165/81 |

(Continued)

FOREIGN PATENT DOCUMENTS

| CN | 202747831 U | 2/2013 |
| CN | 108351175 A | 7/2018 |

(Continued)

OTHER PUBLICATIONS

European Office Action dated Jun. 16, 2020 for family member application EP 18712799.8-1104.

*Primary Examiner* — Jennifer A Leung
(74) *Attorney, Agent, or Firm* — Hudak, Shunk & Farine Co. LPA

(57) ABSTRACT

A heat exchanger having a housing, which defines a first volume (V1), and having at least one conduit, which defines a second volume (V2), wherein the housing has an inlet and an outlet and at least one first opening and at least one second opening located opposite the first opening relative to the housing, wherein the at least one conduit extends through the first volume (V1) and connects the at least one first opening of the housing and the at least one second opening of the housing, and is connected at the two ends of the conduit to the housing in a fluid-tight manner. In order to provide a heat exchanger which has an improved possibility for compensating for the differential thermal expansion of the housing and the conduits, the at least one conduit does not extend in a linear manner inside the first volume (V1), and the at least one conduit is monolithically con- (Continued)

nected in the region of the first opening of the conduit and/or the second opening of the conduit to the housing.

13 Claims, 2 Drawing Sheets

(51) Int. Cl.
    *B01J 19/00*    (2006.01)
    *F28F 1/08*    (2006.01)

(52) U.S. Cl.
    CPC ............... *B01J 8/067* (2013.01); *F28F 1/08* (2013.01); *B01J 2208/00132* (2013.01); *B01J 2208/00141* (2013.01); *B01J 2208/00212* (2013.01); *B01J 2208/00238* (2013.01); *B01J 2208/06* (2013.01); *B01J 2208/065* (2013.01); *B01J 2219/00081* (2013.01); *F28F 2250/102* (2013.01); *F28F 2265/26* (2013.01)

(56) References Cited

U.S. PATENT DOCUMENTS

| | | | |
|---|---|---|---|
| 2,061,742 A * | 11/1936 | Swart | F25B 40/00 55/490.2 |
| 2,185,930 A | 1/1940 | Simpson et al. | |
| 2,751,761 A | 6/1956 | Borgerd | |
| 4,141,835 A * | 2/1979 | Schael | B01D 63/02 210/304 |
| 4,858,584 A | 8/1989 | Bridgeman | |
| 5,379,832 A | 1/1995 | Dempsey | |
| 9,976,815 B1 * | 5/2018 | Roper | B23P 15/26 |
| 10,018,424 B2 * | 7/2018 | Zaffetti | F28D 7/022 |
| 2004/0184976 A1 | 9/2004 | Pagani et al. | |
| 2007/0178029 A1 | 8/2007 | Goebbel et al. | |
| 2009/0183862 A1 | 7/2009 | Benezech et al. | |
| 2010/0243220 A1 | 9/2010 | Geskes et al. | |
| 2016/0061381 A1 | 3/2016 | Kotliar | |
| 2016/0129417 A1 | 5/2016 | Aimone et al. | |

FOREIGN PATENT DOCUMENTS

| | | |
|---|---|---|
| DE | 855258 C | 11/1952 |
| EP | 1048343 A2 | 11/2000 |
| EP | 1563900 A1 | 8/2005 |
| KR | 20120125658 A | 11/2012 |
| WO | 2005073657 A1 | 8/2005 |
| WO | 2008058734 A1 | 5/2008 |
| WO | 2008068156 A1 | 6/2008 |
| WO | 2011008921 A2 | 1/2011 |
| WO | 2013004254 A1 | 1/2013 |
| WO | 2013158916 A1 | 10/2013 |
| WO | 2016003754 A1 | 1/2016 |

\* cited by examiner

HEAT EXCHANGER AND REACTOR

FIELD OF THE INVENTION

The present invention relates to a heat exchanger, its use as a reactor, and a reactor having a heat exchanger.

BACKGROUND OF THE INVENTION

The basic principle of heat exchangers is that heat energy is transferred from a first media stream to a second media stream. The two media streams are not in fluid communication so that mixing does not take place.

In many embodiments, a housing is provided, through which a first medium flows. One or more conduits are arranged in the housing, in which a second medium flows. The media are separated from one another by the wall of the conduit. However, the wall allows heat transfer.

Heat exchangers are divided in terms of the direction of flow of the media streams into direct flow, countercurrent flow, and cross-flow heat exchangers. Direct flow means that the media flow substantially parallel to each other in the same direction. In counterflow, the media run substantially parallel but in the opposite direction. The term cross-flow is used when the media streams flow crosswise, in particular at an angle of 90°.

From the prior art, reactors are also known which comprise a heat exchanger. By a reactor is meant a container in which, when used as intended, a reaction takes place, especially a chemical or biochemical reaction.

Reactors may be used for example in the production of methanol (CH3OH). There, a reactor is fed carbon monoxide (CO) and hydrogen (H2), which react with each other in the reactor. In this case, a catalyst is used, which increases the reaction rate. The reaction is exothermic, so a removal of thermal energy is required.

From EP 1048343 A2 there is known a heat exchanger/reactor which can be used for the production of methanol and which comprises a plurality of straight conduits, in which a catalyst is arranged. The conduits are arranged in a housing through which flows a first medium, thereby bathing the conduits, and they emerge at the end side into a collection space and a distribution space situated opposite relative to the housing. Through the conduits flows a second medium, which consists of the raw materials and end products of the chemical reaction. The reaction takes place in the conduits. Owing to the exothermic reaction, a temperature gradient is produced from the conduits to the housing wall. Therefore, the conduits expand more strenuously than the housing wall, so that they by a respective bellows to the housing wall. The second medium transfers thermal energy to the first medium, which is transported with the first medium out from the housing.

The use of bellows is technically costly in processing and increases the costs of the device. In addition bellows are susceptible to wear, which is also disadvantageous.

WO 2013/004254 A1 proposes arranging the conduits movably in the longitudinal direction on the housing, without providing a bellows. In this way, the use of a bellows is avoided, however the arrangement requires a complex seal between conduit and housing.

U.S. Pat. No. 2,751,761 discloses a heat pump with a boiler, in which a single conduit runs helically. The boiler and the conduit respectively form a volume through which a medium flows, the volumes not communicating with each other. Water flows through the boiler, which is optionally heated or cooled by a temperature difference from the medium flowing in the conduit.

From U.S. Pat. No. 4,858,584 there is known a device for preheating of fuel for internal combustion engines. The device comprises a rod-shaped housing and a helical conduit located therein. The housing has at one end an inlet and at the other end an outlet, respectively arranged tangentially.

U.S. Pat. No. 5,379,832 shows a heat exchanger which also has a housing, but in which two conduits are arranged. For the fabrication of the two conduits, a straight pipe is respectively wound around a core, giving the conduits a helical shape. The two conduits may then be interlocked with each other in different ways.

SUMMARY OF THE INVENTION

The problem which the invention proposes to solve is therefore to provide a heat exchanger having an improved compensation possibility for the differential thermal expansion of the housing and conduits.

This problem is solved with a heat exchanger comprising a housing, which defines a first volume (V1), and comprising at least one conduit, which defines a second volume (V2), wherein the housing has an inlet and an outlet and at least one first opening and at least one second opening located opposite the first opening relative to the housing, wherein the at least one conduit extends through the first volume (V1) and connects the at least one first opening of the housing and the at least one second opening of the housing, and is connected at the two ends of the conduit to the housing in a fluid-tight manner, wherein the at least one conduit does not extend in a linear manner inside the first volume (V1), and the at least one conduit is monolithically connected in the region of the first opening of the conduit and/or the second opening of the conduit to the housing.

The heat exchanger comprises a housing and at least one conduit. The housing defines a first volume and the at least one conduit defines a second volume. The housing has an inlet and an outlet and at least one first opening and at least one second opening situated opposite the first opening relative to the housing. The at least one conduit passes through the first volume and connects the at least one first opening of the housing to the at least one second opening of the housing, being connected fluid-tight at both ends to the housing. The first volume and the second volume therefore do not have a fluid connection, so that mixing of the first medium and the second medium is prevented.

The heat exchanger is characterized in that the at least one conduit does not extend within the first volume in linear manner and that the at least one conduit is connected monolithically to the housing in the region of its first opening and/or its second opening.

The housing of the heat exchanger according to the invention can receive a flow of a first medium from the inlet to the outlet. At least one conduit of the housing can receive a flow of a second medium from the first opening to the second opening or in the opposite direction. When used as intended, a transfer of thermal energy occurs from the first medium to the second medium or vice versa. Thanks to the nonlinear profile, a deformation of the at least one conduit is made possible without a buildup of stresses endangering the material of the conduits, the housing or their connection. If, when used as intended, a thermally induced expansion of a conduit and/or the housing should occur, this expansion is compensated by a deformation of the conduit. The conduit thus forms at the same time the expansion or compensating element, so that no additional compensating element such as a bellows is required.

The monolithic connection is advantageous in terms of the sealing between the first and second volume, since no separate sealing elements and/or materials are needed.

Preferably, each conduit is matched up with precisely one first opening and one second opening, and each first opening and each second opening is matched up with precisely one conduit. The second medium then flows from a region outside of the housing through the first opening or the second opening into the associated conduit, flows through this conduit and exits the second volume through the other opening in a region outside of the first volume.

Preferably also the inlet is situated disposed opposite to the outlet relative to the housing. The housing comprises in particular all the walls or wall sections which bound both the first volume and the inlet and the outlet.

In advantageous modifications, it is provided that imaginary connecting lines between the at least one first opening and the at least one second opening on the one hand and between the inlet and outlet on the other hand are substantially parallel. By substantially parallel is also meant arrangement in which the connecting lines subtend an angle of <50°, in particular <20°. The substantially parallel arrangement of the connecting line means that the first medium and the second medium flow in the same direction or counter to each other. This ensures a uniform transfer of thermal energy.

The "main flow direction" of a conduit denotes a direction along the connecting lines between the first and the second of the conduits. Especially preferably, the conduit extends such that the flow in the conduit at no point has a component counter to the main flow direction. As a result, no switching occurs between parallel and counter flow relative to second medium flowing in the conduit on the one hand and the first medium surrounding the conduit, on the other hand. This results in a uniform, controlled transfer of thermal energy from the one medium to the other, by avoiding a temperature gradient in the first medium transversely to the main flow direction.

In one advantageous development it is provided that the housing has a longitudinal axis L and is divided by an imaginary surface A lying perpendicular to the longitudinal axis L into a first housing portion and a second housing portion. The housing portions need not be separate components. The inlet and the at least one first opening are situated in the first housing potion and the outlet and the at least one second opening are situated in the second housing portion. In this way, the at least one first opening and the at least one second opening are situated opposite each other in regard to the housing. Likewise, the inlet and the outlet are situated opposite each other in regard to the housing.

Preferably the at least one first opening and the at least one second opening are situated opposite each other in regard to a housing and/or volume midpoint. Particularly preferably, an imaginary connecting line between the first opening associated with a conduit and the at least one second opening associated with the same conduit runs through the housing and/or volume midpoint.

Further preferably, the inlet and the outlet are situated opposite each other in regard to a housing and/or volume midpoint. Especially preferably an imaginary connecting line runs between the inlet and the outlet through the housing and/or volume midpoint.

In advantageous modifications, the housing has a middle part and two opposite end pieces. The middle part is preferably cylindrical. This shape allows a rotationally symmetrical arrangement of a plurality of conduits in the housing and a homogeneous flow of the first medium. The end pieces are preferably rotationally symmetrical. For ease of manufacture, the end pieces are preferably identical.

Particularly preferably, the inlet and the at least one first opening are situated at the one end piece and the outlet and the at least one second opening at the other end piece. This results in an opposite arrangement with respect to the housing for the at least one first opening and the at least one second opening on the one hand and for the inlet and the outlet on the other hand.

A plurality of conduits is preferably provided, whereby the heat transfer occurs more evenly and effectively in the first volume. By a plurality of conduits, their surface is increased and therefore more thermal energy on the whole can be transferred between the media. In other words, the heat transfer performance of the heat exchanger is enhanced in this way.

In particularly advantageous modifications, it is provided that the housing has a longitudinal axis L and a plurality of conduits is arranged rotationally symmetrical about the longitudinal axis L of the housing. This allows for a homogeneous distribution of the conduits in the housing, which likewise allows for an improved heat transfer between the media.

Basically the at least one conduit according to the invention may have any form of a non-linear profile. The at least one conduit may in particular also have linear sections, as long as the conduit also comprises changes of direction. A center line of a conduit may in particular have a two-dimensional or three-dimensional profile.

Especially preferably, the at least one conduit runs at least partially in an arc and/or a wave and/or a helix and/or a zig zag shape. In particular, a wave or a helical shape enable a high flexibility, whereby also a large thermal expansion of a conduit or of the housing can be compensated without significant material stress.

If a plurality of conduits is provided, the conduits may be shaped identically or differently. Preferably, all conduits are identical, so that a uniform flow is ensured in all conduits.

In one advantageous modification of the invention it is provided that the cross-sectional profile of the at least one conduit varies along its course. Either the internal cross section may vary, through which the second medium flows, or the outer shape of the at least one conduit may vary. In this way, different flow rates and/or different-sized contact surfaces for the first medium and/or the second medium can be realized in different sections along a conduit. This may affect how large the heat transfer is on different sections of a conduit.

Advantageously, a plurality of conduits is provided in the heat exchanger, and the heat exchanger has at least one collector and/or one distributor. Several conduits are in fluidic communication with the collector across their respective associated first opening and/or to the distributor across their respective associated second opening. The distributor has a feed and/or the collector has a drain for the second medium. The distributor supplies the conduits with the second medium and the collector facilitates the removal of the second medium from the conduits, since only one respective connection (feed and drain) is necessary.

Especially preferably it is provided that the housing has a longitudinal axis L and the collector and/or the distributor comprises a feed and a drain, respectively, situated tangentially to an imaginary circle about the longitudinal axis L of the housing. The advantage of this arrangement is that the second medium is distributed uniformly among all conduits, especially in an otherwise rotationally symmetrical construction about the longitudinal axis L. Even so, the central end sections of the housing are not installed, so that the inlet and the outlet for the first medium may be arranged in the first volume at the same time along the longitudinal axis. Particularly preferably, the feed and/or drain is arranged tangentially to an outer wall of the collector and/or the distributor.

The heat exchanger has at least one conduit and a housing. The housing may comprise a middle part and two end pieces. Furthermore, the housing may comprise a collector and a distributor. The conduit and the housing are connected to each other monolithically according to the invention at least in the region of the first and/or second opening. If the inlet and the at least one first opening are arranged for example at the one end piece and the outlet and the at least one second opening are arranged at the other end piece, the at least one conduit and the end pieces are formed monolithically. Moreover, the at least one conduit, the end pieces and the middle part or the at least one conduit, the end pieces, the middle. The monolithic design is especially advantageous for the heat exchanger, since in this way additional materials are avoided, making possible a more uniform heat transfer.

The monolithically interconnected elements consist of a single piece of material. If several elements are monolithically connected and furthermore there are other components, then the other components of the heat exchanger are preferably joined by integral bonding to the monolithically formed elements. In particular, the middle part and/or the collector and/or the distributor may be integrally bonded to the monolithically formed elements.

The monolithically formed elements are preferably produced by means of additive manufacturing.

The heat exchanger can have a single piece design, in particular a monolithic or compound design. A single-piece production, which is achieved for example by an integral bonding of two components, is generally more costly, yet it affords advantages in terms of tightness and stability. A component is monolithic when it is made entirely from one piece of material. The monolithic design is particularly advantageous for the heat exchanger, since additional materials are avoided in this way. A compound fabrication allows the use of easy to manufacture components such as pipes with round cross section, which leads to a reduction in manufacturing costs.

If the heat exchanger has a compound design, at least individual parts or subassemblies will preferably be monolithic. In particular, the conduits or the conduits with adjacent housing sections or the conduits together with the housing or the conduits together with the middle part and the end pieces are designed as a monolithic unit. This reduces the assembly costs. The collector and the distributor cannot be produced monolithically with the conduits in this case.

Especially preferably, the heat exchanger or parts or subassemblies of the heat exchanger are made by means of additive manufacturing, in particular, selective laser sintering or selective laser melting. In additive fabrication methods, a body to be manufactured is produced layer by layer. This production is particularly suitable for complex components. It is therefore particularly advantageous if the heat exchanger is made as a single piece, namely monolithic, by additive manufacturing.

In advantageous modifications, the heat exchanger has auxiliary structures, in particular in the form of deflecting elements, surface structures and connecting elements. Surface structures can be, for example, grooves, ribs, indentations or projections. Connecting elements may join several conduits to each other or one or more conduits to the housing. In this way, for example, the surface can be increased, the stability improved, or a surface provided for applying catalysts. The auxiliary structures are preferably formed monolithically with parts or subassemblies of the heat exchanger, particularly with the conduits and/or the housing. The monolithic production, in particular by means of additive manufacturing, makes possible a specific providing of auxiliary structures precisely adapted to the particular purpose of use of the heat exchanger. Thus, superfluous auxiliary structures can be avoided, which saves on material and achieves an enhanced heat transfer. Auxiliary structures may be provided in the first volume, i.e., inside the housing, and/or in the second volume, i.e., inside the conduits.

The reactor according to the invention comprises a heat exchanger according to the above remarks. Optionally, in the at least one conduit, i.e., in the second volume, or outside the at least one conduit in the housing, i.e., in the remaining first volume, a catalyst material is arranged, which accelerates or initiates a reaction in the reactive medium flowing in the conduit or outside the conduit in the housing. The other medium flows through the respective other volume as heat transport medium for the purpose of heat dissipation or supply to the reactive medium. The heat exchanger according to the above remarks is preferably used in this sense as a reactor.

For handling reasons, it is especially preferable to arrange the catalyst material outside the at least one conduit in the housing, if its inlet and outlet have larger cross sections than the openings of the conduit(s). It is then easier to use the inlet and/or outlet of the housing for the introduction and removal of the catalyst material. However, the need for catalyst material in relation to heat transfer and thus the choice of the volume distribution among the first and the second medium determines not only the handling, but also the endo- or exothermic nature of the reaction. Therefore, the reverse case may also be desired, in which the catalyst material should be introduced into the conduit(s). The catalyst material can be introduced as a loose fill or as a coating of the surfaces in the reactor or the conduits. A coating can be produced, for example, by a wash coating as described in the publication of R. Zapf, C. Becker-Willinger, K. Berresheim, H. Bolz, H. Gnaser, V. Hessel, G. Kolb, P. Löb, A-K. Pannwitt, A. Ziogas, Trans IChemE A, 81 (2003) 721.

An exemplary application of such a reactor is the production of methanol. The reactive medium before flowing into the optional first or second volume consists of a mixture of carbon monoxide and hydrogen and, after the reaction, i.e., upon flowing out from the first and second volume, of methanol, each time not counting unavoidable impurities. The other medium is then a heat transport medium, i.e., for example, water or air or thermal oil. Optionally, carbon monoxide and hydrogen can also be supplied separately and mixed only in the first or second volume. There would then be a combined reactor and mixer. However, this requires a more complicated and therefore usually also more expensive construction of the conduits and/or housing structure.

BRIEF DESCRIPTION OF THE DRAWINGS

The invention shall be explained and presented below with the aid of two figures. There are shown.

DETAILED DESCRIPTION OF THE INVENTION

Figure 1:
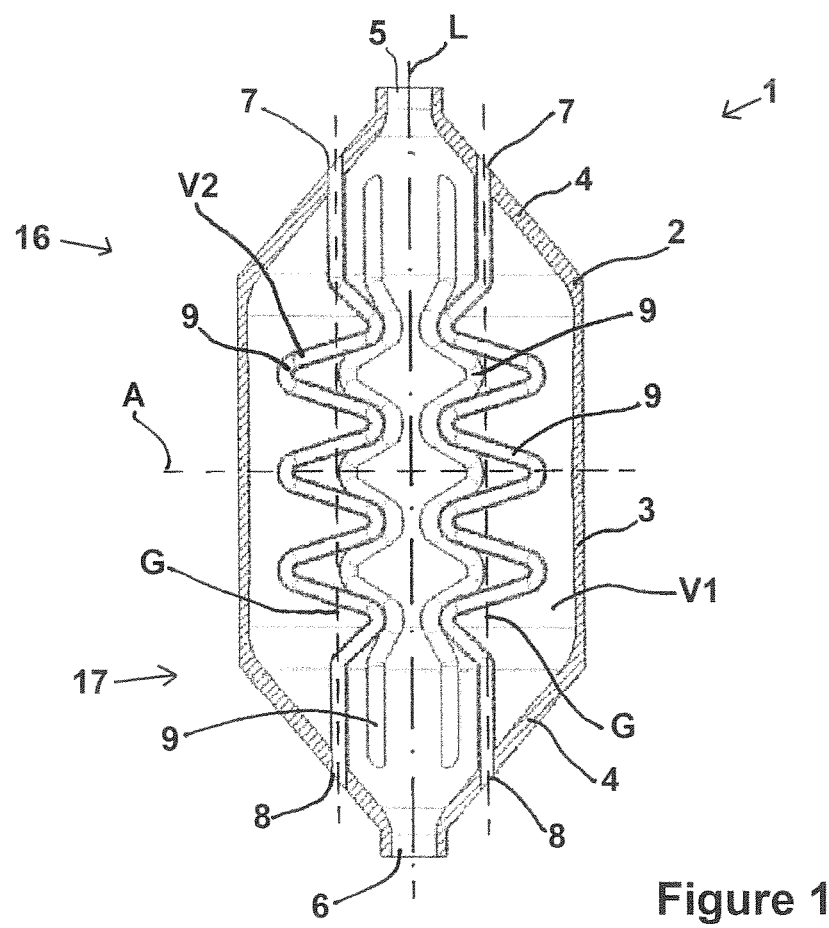
FIG. 1, a side view of a first embodiment of the heat exchanger in cross section.

The heat exchanger 1 shown in FIG. 1 comprises a housing 2 having a middle part 3 and two opposite end pieces 4. The housing 2 comprises an inlet 5 and an outlet 6, which are each arranged in an end piece 4. The inlet 5 and the outlet 6 are arranged on opposite sides with respect to housing 2. Between the inlet 5 and the outlet 6 extends a longitudinal axis L of the housing 2, which also forms its central axis and the connecting line between the inlet 5 and an outlet 6. The middle part 3 and the end pieces 4 are thus each rotationally symmetrical about the longitudinal axis L, i.e., the middle part 3 is formed in particular as a cylinder shell.

The housing 2 defines a first volume V1.

The housing 2 has six first openings 7 and six second openings 8. The first openings 7 are arranged opposite the second openings 8 relative to the housing 2. Of the first openings 7 and the second openings 8 in each case two are visible in cross section. The heat exchanger 1 has six conduits 9, of which four are discernible in the cross section (two of them sectioned, two non-sectioned). Each conduit 9 extends from its associated first opening 7 to its associated second opening 8 and interconnects them. The conduits 9 are rotationally symmetrically disposed about the longitudinal axis L. In the area of the openings 7, 8, the conduits 9 are monolithically connected to the housing 2. The conduits 9 define a common second volume V2.

Connecting lines G run between the first openings 7 and second openings 8 respectively associated with the same conduits 9. The connecting lines G of the different conduits 9 are all parallel to the longitudinal axis L.

An imaginary surface A, which is disposed perpendicular to the longitudinal axis L, divides the heat exchanger 1 into a first housing portion 16 and a second housing portion 17. The inlet 5 and the first openings 7 are arranged in the first housing portion 16, the outlet 6 and the second openings 8 are arranged in the second housing portion.

When used as intended, a first medium flows from a region outside the housing 2 through the inlet 5 into the first volume V1, and then through the outlet 6 into a region outside of the housing 2. Due to the rotationally symmetrical arrangement and the continuous broadening and narrowing of the housing 2 along the connecting lines and center line L, the first medium expands in the first volume V1 after entering it, at first with slowing down of the flow rate speed in uniform manner and without turbulence, and after the reaction and/or heat transfer it flows through the outlet 6, once more accelerated, and out from the housing 2.

At the same time a second medium flows through the conduits 9 during the operation. In a first operating mode, the second medium flows from the first openings 7 in the direction of the second openings 8. In this operating mode, the heat exchanger 1 is a direct-flow heat exchanger, since the main flow directions of both media are parallel and in the same direction. In a second operating mode, the second medium flows from the second openings 8 in the direction of the first openings 7. In this operating mode, the heat exchanger 1 is a counter-flow heat exchanger, since the main flow directions of both media are parallel and opposite.

The first medium and the second medium have a different temperature prior to entry into the housing 2 or the conduits 9 In the housing 2, a heat transfer therefore occurs from the warmer medium to the colder medium.

The cables 9 extend run in wavy or zigzag manner and have alternately straight and curved sections. Therefore, in certain of the sections the conduits 9 also run transversely to the longitudinal direction of the housing 2 and thus to the main flow direction along the connecting lines G. However, at no point in the conduits 9 does the flow direction change, such that it has a component counter to the main flow direction. In other words, the flow at each location in the conduits runs from top to bottom in the case of the direct-flow heat exchanger or vice versa in the case of the countercurrent heat exchanger. This, in contrast to an up and down flow, such as in U-shaped tube bundle heat exchangers, ensures a better transverse temperature homogeneity and therefore a more uniform temperature adaptation in the first medium.

If there is a thermal expansion of a conduit 9 or the housing 2, the conduits 9 can be deformed due to their configuration deviating from a straight line, that is, expand or contract especially in the direction of the longitudinal axis L relative to the housing 2, thereby equalizing the material expansion.

The heat exchanger 1 can be filled with a catalytic material and used as a reactor. The catalytic material may be introduced for example in the form of a loose fill or a granulate through both the inlet 5 and/or the outlet 6 into the housing 2 in the first volume V1 of the housing 2 and also through the first and/or second openings 7, 8 in the second volume V2 of the conduits 9. This depends, as described above, on the one hand on the handling and on the other hand on the endothermic or exothermic reaction.

The catalyst material can also be introduced in the form of a thin layer onto an inner surface of the heat exchanger. This is particularly possible when the surface to be coated is large, as in the case of the housing inner wall and/or many conduit exterior surfaces. The individual surfaces may additionally be structured in the form of a thin layer for the purpose of increasing the surface area.

Figure 2:
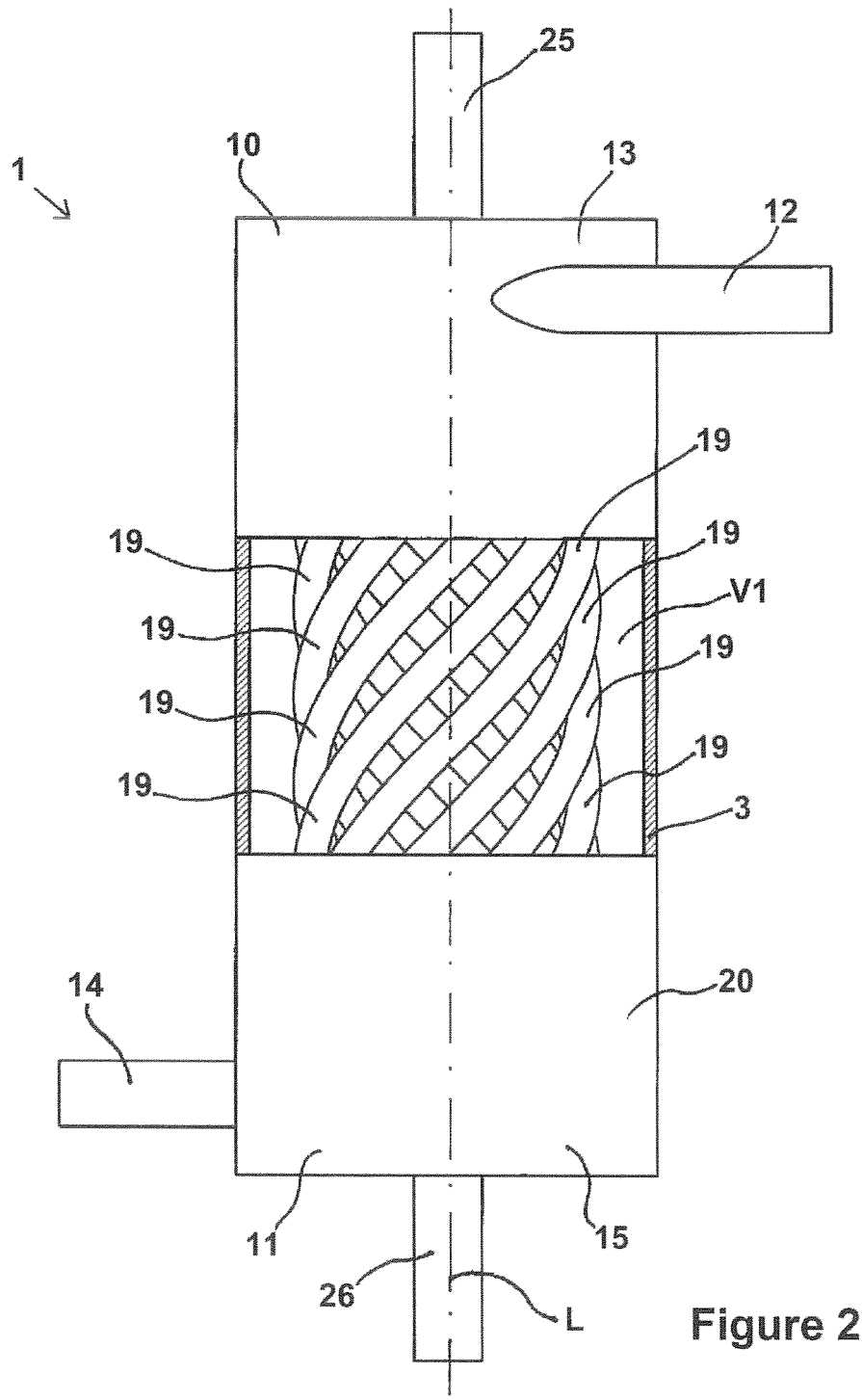
FIG. 2, a side view of a second embodiment of the heat exchanger in partial cross section.

The second embodiment of the heat exchanger 1 according to FIG. 2, in contrast to the first embodiment, has a plurality of helical conduits 19. The conduits 19 are arranged in a housing 20, which is shown in partial section. The housing 20 has at its end face a distributor 10 and a collector 11. The distributor 10 and the collector 11 are arranged on opposite sides relative to the housing 20, The conduits 19 are fluidically connected via first openings, not shown, to the distributor 10 and via second openings, not shown, to the collector 11.

The distributor 10 is cylindrical and has a feed 12 for the second medium. Except for the feed 12, which is disposed tangentially to the casing surface 13 of the distributor 10, the distributor 10 is rotationally symmetrical to the longitudinal axis L of the housing 20.

The collector 11 is cylindrical and has a drain 14 for the second medium. The drain 14 is also disposed tangentially to the casing surface 15 of the collector 11, which is moreover rotationally symmetrical to the longitudinal axis L of the housing 20.

Otherwise, the housing 20 is constructed once again rotationally symmetrical to the longitudinal axis or central axis L, which again forms at the same time the connecting line between the inlet 25 and an outlet 26.

Thus, the second medium is distributed uniformly among all conduits 19 in this largely rotationally symmetrical construction about the longitudinal axis L, because it is introduced tangentially. And the first medium furthermore flows evenly distributed into the first volume V1, because it is fed to it at the middle through the central end sections portions.

The research that led to these results was funded by the European Union.

LIST OF REFERENCE NUMBERS

1 Heat exchanger
2 Housing
3 Middle part
4 End piece
5 Inlet
6 Outlet
7 First opening
8 Second opening
9 Conduit
10 Distributor
11 Collector
12 Feed
13 First casing surface
14 Drain
15 Second casing surface
16 First housing portion
17 Second housing portion
19 Conduit
20 Housing
25 Inlet
26 Outlet
A Surface
G Connecting line
L Longitudinal, center axis
V1 First volume
V2 Second volume

What is claimed is:

1. A reactor with a heat exchanger, comprising:
a housing, which defines a first volume (V1), and comprising at least one conduit, which defines a second volume (V2),
wherein the housing has an inlet and an outlet and at least one first opening and at least one second opening located opposite the at least one first opening relative to the housing,
wherein the at least one conduit extends through the first volume (V1) and connects the at least one first opening of the housing and the at least one second opening of the housing, and is connected at two ends of the conduit to the housing in a fluid-tight manner,
wherein the at least one conduit does not extend in a linear manner inside the first volume (V1), and the at least one conduit is monolithically connected in the region of the at least one first opening and/or the at least one second opening to the housing,
wherein the housing has a middle part in the shape of a cylindrical shell, and two oppositely situated end pieces,
wherein the inlet and the at least one first opening are situated at the one end piece, and the outlet and the at least one second opening are situated at the other end piece, and
wherein a catalyst material is arranged in the at least one conduit or outside of the at least one conduit in the housing.

2. The reactor with the heat exchanger according to claim 1, wherein a plurality of said at least one conduit are provided, being formed monolithically together with the housing.

3. The reactor with the heat exchanger according to claim 1, wherein a plurality of said at least one conduit are provided, being formed monolithically as a unit together with the middle part and end pieces.

4. The reactor with the heat exchanger according to claim 1, wherein the housing has a longitudinal axis (L) and a plurality of said at least one conduit are arranged rotationally symmetrical about the longitudinal axis (L) of the housing.

5. The reactor with the heat exchanger according to claim 1, wherein the at least one conduit runs at least partially in an arc and/or a wave and/or a helix and/or a zig zag shape.

6. The reactor with the heat exchanger according to claim 1, wherein a cross-sectional profile of the at least one conduit varies along its course.

7. The reactor with the heat exchanger according to claim 1, wherein a plurality of said at least one conduit are provided and the heat exchanger has at least one collector and/or one distributor, wherein the conduits are in fluidic communication with the at least one collector across the at least one first opening and/or with the distributor across the at least one second opening.

8. The reactor with the heat exchanger according to claim 7, wherein the housing has a longitudinal axis (L) and the at least one collector and/or the distributor comprises a feed or drain, wherein the feed and/or the drain, are situated tangentially to an imaginary circle about the longitudinal axis (L) of the housing.

9. The reactor with the heat exchanger according to claim 1, wherein auxiliary structures are arranged in the first volume (V1) and/or the second volume (V2).

10. The reactor with the heat exchanger according to claim 9, wherein the auxiliary structures are one or more of deflecting elements, surface structures, and connection elements.

11. The reactor with the heat exchanger according to claim 1, wherein the housing has a longitudinal axis (L) and a plurality of said at least one conduit are arranged rotationally symmetrical about the longitudinal axis (L) of the housing, and wherein the conduits run at least partially in an arc and/or a wave and/or a helix and/or a zig zag shape.

12. The reactor with the heat exchanger according to claim 11, wherein a cross-sectional profile of the conduits varies along its course, and wherein the reactor with the heat exchanger has at least one collector and/or one distributor, wherein the conduits are in fluidic communication with the at least one collector across the at least one first opening and/or with the distributor across the at least one second opening.

13. The reactor with the heat exchanger according to claim 12, wherein the at least one collector and/or the distributor comprises a feed or drain, wherein the feed and/or the drain are situated tangentially to an imaginary circle about the longitudinal axis (L) of the housing, and wherein auxiliary structures are arranged in the first volume (V1) and/or the second volume (V2).

* * * * *